United States Patent
Kah et al.

(10) Patent No.: US 7,578,861 B2
(45) Date of Patent: Aug. 25, 2009

(54) REFORMER AND PROCESS FOR REACTING FUEL AND OXIDIZER INTO REFORMATE

(75) Inventors: Stefan Kah, Neubrandenburg (DE); Matthias Jahn, Gauting (DE); Marco Muehlner, Neubrandenburg (DE); Andreas Lindermeir, Neubrandenburg (DE); Sena Kavurucu, Neubrandenburg (DE)

(73) Assignee: Enerday GmbH, Stockdorf (DE)

( * ) Notice: Subject to any disclaimer, the term of this patent is extended or adjusted under 35 U.S.C. 154(b) by 331 days.

(21) Appl. No.: 11/048,865

(22) Filed: Feb. 3, 2005

(65) Prior Publication Data

US 2005/0188618 A1   Sep. 1, 2005

(30) Foreign Application Priority Data

Mar. 1, 2004   (DE) .................. 10 2004 010 014

(51) Int. Cl.
*B01J 8/00* (2006.01)
*B01J 7/00* (2006.01)
(52) U.S. Cl. .................................. 48/127.9; 48/61
(58) Field of Classification Search ................ 48/127.9, 48/61
See application file for complete search history.

(56) References Cited

U.S. PATENT DOCUMENTS

| | | | |
|---|---|---|---|
| 5,648,305 A * | 7/1997 | Mansfield et al. ............ 502/27 |
| 6,448,441 B1 | 9/2002 | Wing-Chiu et al. |
| 6,472,092 B1* | 10/2002 | Matsuda et al. ................ 429/17 |
| 2002/0033251 A1* | 3/2002 | Herzog et al. ................ 165/155 |
| 2002/0172846 A1* | 11/2002 | Hagan et al. .................. 429/20 |
| 2003/0044331 A1* | 3/2003 | DeBellis et al. ............. 422/198 |
| 2003/0066240 A1 | 4/2003 | Keller |
| 2003/0118489 A1* | 6/2003 | Hagan et al. ................. 422/191 |
| 2004/0014826 A1 | 1/2004 | Wang et al. |

FOREIGN PATENT DOCUMENTS

| | | |
|---|---|---|
| DE | 692 12 121 T2 | 6/1993 |
| DE | 199 55 892 A1 | 6/2001 |
| EP | 0 330 751 A2 | 9/1989 |
| EP | 1 010 462 B1 | 6/2000 |
| EP | 1 190 765 A2 | 3/2002 |
| GB | 2 305 186 A | 4/1997 |
| WO | 96/32188 A1 | 10/1996 |

* cited by examiner

*Primary Examiner*—Walter D Griffin
*Assistant Examiner*—Natasha Young
(74) *Attorney, Agent, or Firm*—David S. Safran; Roberts Mlotkowski Safran & Cole, P.C.

(57) ABSTRACT

A reformer (10) for reacting fuel (12, 14) and oxidizer (16, 18) into reformate (20), with a plurality of reaction zones (22, 24) to which the fuel (12) and oxidizer (16) are supplied and in each which the fuel and oxidizer are reacted into reformate. The process for reacting fuel and oxidizer into reformate separately adjusting the fuel and/or oxidizer supplied to the reaction zones for varying the reformate output produced.

10 Claims, 2 Drawing Sheets

REFORMER AND PROCESS FOR REACTING FUEL AND OXIDIZER INTO REFORMATE

BACKGROUND OF THE INVENTION

1. Field of Invention

The invention relates to a reformer for reacting fuel and oxidizer into reformate, with a reaction zone to which the fuel and oxidizer can be supplied.

The invention relates furthermore to a process for reacting fuel and oxidizer into reformate in a reformer with a reaction zone, in which fuel and oxidizer are supplied to the reaction zone.

2. Description of Related Art

Generic reformers and generic processes have numerous applications. In particular, they are used to supply a hydrogen-rich gas mixture to a fuel cell, from which, then, based on electrochemical processes, electrical energy can be produced. These fuel cells are used, for example, in the motor vehicle art as auxiliary energy sources, for example, APUs ("auxiliary power units").

The design of the reformer is dependent on many factors. In addition to taking into account the properties of the reaction system, for example, economic aspects are important, in particular, the incorporation of the reformer into its environment. The latter relates also to the time behavior of the flows of energy and matter entering and leaving the reactor. Thus, depending on the application and the environment of the reformer, different reforming processes are used; this entails different reformer constructions.

For example, catalytic reforming is known in which some of the fuel is oxidized in an exothermal reaction. The disadvantage in this catalytic reforming is the large amount of heat which is produced and which can irreversibly damage the system components, especially the catalyst.

Another possibility for producing a reformate from hydrocarbons is steam reforming. In this case, hydrocarbons are reacted into hydrogen using water vapor in an endothermal reaction.

A combination of these two principles, i.e., reforming based on an exothermal reaction and production of hydrogen by an endothermal reaction in which energy for steam reforming is obtained from combustion of hydrocarbons, is called autothermal reforming. Here, however, there are the additional disadvantages that a supply possibility for water must be made available. High temperature gradients between the oxidation zone and the reforming zone represent other problems in the temperature economy of the entire system.

Reforming using the process of partial oxidation (POX) involves reforming of hydrocarbon-containing fuels, for example, diesel or gasoline, and can be carried out with a catalyst (CPOX=catalytic partial oxidation) or without a catalyst (TPOX=thermal partial oxidation). Net heat production in the reforming process of partial oxidation is so great that, with a corresponding design of the system, temperatures distinctly above the allowed upper limits of the material can occur if no countermeasures are taken. This can lead to damage of the materials involved, for example, of the catalyst.

One example of a reformer in which measures to avoid damage to the catalyst by high temperatures have been taken is disclosed in German Patent DE 199 55 892 C2. In this reformer, the catalyst is located outside of the area of the reaction zone in which the highest temperatures occur, so that no damage to the catalyst by the high temperatures can take place.

A more precise examination of the temperature conditions within the reformer indicates that, in the process of partial oxidation, a so-called hot-spot forms within the oxidation zone. Since the oxidation zone, for its part, builds up in the area of the input, i.e., of fuel feed, of the reaction zone, and then, a decrease of the temperature occurs due to endothermal reforming reactions, the hot-spot is located in the input area of the reaction zone. In any case, the location of the hot-spot is dependent on the fuel output or the load modulation of the reformer, since it influences the residence time of the reacting substances. Thus, the hot-spot, depending on the fuel output, can be located at different points of the oxidation zone; this increases the potentially damaged area of the reaction zone. Other problems are associated with the fact that, for low output, most of the exothermal chemical reactions are concentrated at the input area of the reaction zone. Consequently, the product mixture must still traverse a long path through the reaction zone on which it can release heat, for example, to the catalyst. This can lead to the product gas temperature at the exit from the reformer being too low, especially for continued processing of the reformate in a fuel cell.

Other problems resulting from the temperature drop in the reaction zone are associated with the fact that, due to the low temperatures in the reforming zone located downstream of the oxidation zone, hydrocarbon emissions are high due to the low fuel conversions, and the tendency of the catalyst to coking and poisoning is increased. Consequently, catalysts with large reaction zones are required. If the intention is to regenerate a catalyst as a result, for example, of coking, the operating mode of the reformer must be changed by, for example, complete oxidation taking place. During this regeneration mode, no reformate can be made available. As a result, a downstream fuel cell cannot produce electrical energy during this time.

SUMMARY OF THE INVENTION

A primary object of the invention is to provide a reformer and a process for reaction of fuel and oxidizer so that components are not damaged; and which, in addition, will make it possible to easily and reliably influence the reforming process, especially reforming using the process of partial oxidation (POX).

This object is achieved by a reformer for reacting fuel and oxidizer into reformate which has more than one reaction zone for receiving the fuel and oxidizer and wherein each of the reaction zones is adapted to react fuel and oxidizer into reformate.

The invention a reformer with more than one reaction zone to which fuel and oxidizer can be supplied and reacted into reformate. Thus, by subdividing the reaction part of the reformer into, for example, two reaction zones, the three-dimensional area over which the hot-spot due to the variation of fuel output can be located is reduced. In a good approximation, the three-dimensional region for the hot-spot is cut in half. The modulation of the fuel output can take place based on the division, for example, by only one of the reaction zones being operated or by the reaction zones working with different fuel outputs.

The invention leads to special advantages when the reacting takes by the process of partial oxidation (POX) since especially high temperatures occur in this process.

This applies especially in the case in which reacting takes place using the process of catalytic partial oxidation (CPOX). In this case, as mentioned, damage to the catalyst can be avoided.

It is especially useful for the reaction zones to be in thermal contact. In this way, temperature equalization between the reaction zones can take place. Hot regions of a reaction zone can release heat to cooler regions of the other adjacent reaction zone.

This is especially useful in the connection that the reaction zones have an essentially axially symmetrical arrangement, one reaction zone surrounding the other, that the main flow direction of the substances which are reacting with one another is essentially the axial direction and that the main flow directions are opposite in the reaction zones which are adjacent to one another. In this way, the axial temperature profile is made uniform. The hot oxidation regions of one reaction zone are adjacent to the cooling reforming zones of the adjacent reaction zone. This leads, on the one hand, to the possibility of reducing the temperature of the oxidation zone. On the other hand, the temperature of the reforming zone can be kept at a high level. The problem of high hydrocarbon emissions due to low fuel conversions and the tendencies of the catalyst to coking and poisoning are thus reduced.

Furthermore, a heat exchanger can be provided for dissipating heat from the reaction zones. In this way, in particular, the temperature of the hot-spot can be reduced. Preferably, both air and air to which steam or other components have been added, for example, from combustion processes, are suited as the cooling medium. In the case of using a reformer in an APU which works, for example, based on a high temperature fuel cell (for example, an SOFC), especially the air flow which is routed to the cathode of the fuel cell is suited as the heat transfer medium.

The reformer in accordance with the invention is developed in an especially advantageous manner in that reformer output in portions of the reaction zones can be separately adjusted via the supplied amounts of fuel and/or oxidizer. Generally, each reaction zone has its own fuel supply and its own oxidizer supply, and the ability to metere supply of the substances can be implemented by division of a common supply and by valves which are provided in the branches.

The process of the invention involves the use of more than one reaction zone to which fuel and oxidizer can be supplied and reacted into reformate and reformer output from the reaction zones being separately adjusted via the supplied amounts of fuel and oxidizer being separately adjusted. In this way, the advantages and particulars of the reformer of the invention are also implemented within the framework of the process. This also applies to the especially preferred embodiments of the process in accordance with the invention given below.

The process is advantageously developed such that reaction takes place using the process of partial oxidation (POX).

It can furthermore be provided that reaction takes place using the process of catalytic partial oxidation (CPOX).

It is preferred that the reaction zones are in thermal contact.

It is especially useful for the reaction zones to have an essentially axially symmetrical arrangement, one reaction zone surrounding the other, that the main flow direction of the substances which are reacting with one another is essentially the axial direction and that the main flow directions are opposite in the reaction zones which are adjacent to one another.

It is furthermore advantageous for the heat from the reaction zone to be dissipated with a heat exchanger.

The invention is based on the finding that providing several reaction zones has a positive effect on the thermal economy of the reformer. Hot areas can be locally stabilized even if the reformer output is modulated. Other advantages are associated with the fact that dividing the reaction zones reduces the pressure loss in the reformer. This leads to an increase of efficiency. The invention furthermore provides beneficial effects on the regeneration possibilities of the reformer. If the catalyst activity decreases, for example, due to soot formation and/or poisoning, the individual reaction zones can be regenerated independently of one another with the oxidizer. This enables regeneration of, for example, one reaction zone while the other reaction zone(s) can produce hydrogen without interruption. This process can be conducted such that no oxygen or almost no oxygen reaches the fuel cell anode. The soot and $H_2$ and CO emerging from the reaction zone can be burned post-catalytically and soot formation can be reduced. Still further, it is advantageous that, as a result of the different operating possibilities for providing a certain reformer output, the proportions of $CO_2$ and $H_2O$ in the reformate are variable so that the proportions can be matched to the requirements of the fuel cell.

The invention is described in detail below with reference to the accompanying drawings and using especially preferred embodiments by way of example.

DETAILED DESCRIPTION OF THE INVENTION

Figure 1:
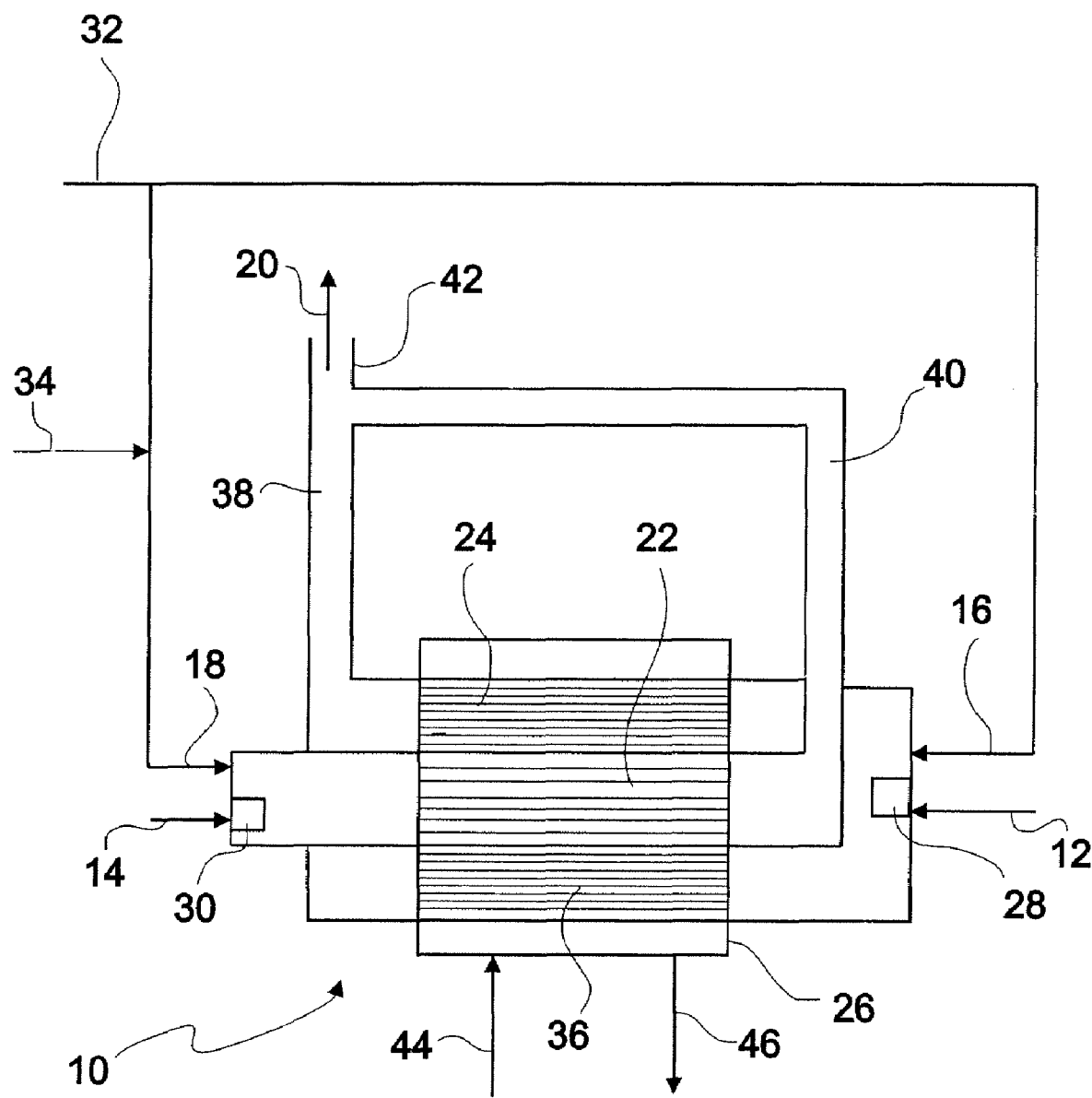
FIG. 1 is a schematic of the reformer in accordance with the invention.

FIG. 1 shows a schematic of a reformer 10 in accordance with the invention that has two reaction zones 22, 24. The reaction zones 22, 24 are made essentially axially symmetrical, one reaction zone 24 surrounding the other reaction zone 22. At the input of each of the reaction zones 22, 24, there is an injection system 28, 30 for injection of fuel 12, 14 into the reaction zones 22, 24.

Furthermore, oxidizer 16, 18, i.e., especially air, can be supplied to the reaction zones 22, 24. For this purpose, there can be separate air supplies, or as in this example, there can be a central air supply 32, and one or more valves 34 can be provided to vary the amounts of air which are supplied to the respective reaction zones 22, 24. Within the reaction zones 22, 24, there is a catalyst 36 or several catalysts so that a reforming process can be carried out using the principle of catalytic partial oxidation (CPOX). Additionally, there are product gas guides 38, 40 which lead to a mixing point 42. On the other side of this mixing point 42, the reformate can be removed from the reformer 20. Also, there is a heat exchanger 26 in the area of the catalyst 36 which is designed for cooling the participating components and especially the catalyst 36 by means of a cooling medium with a feed 44 and return 46.

The illustrated reformer 10 works as follows. If the reformer 10 is to operate with maximum reformer output, fuel 12, 14 is supplied via the respective injections systems 28, 30 to the two reaction zones 22, 24. Likewise oxidizer 16, 18 is supplied to each reaction zone 22, 24. The gases flow in the opposite directions through the reaction zones 22, 24. Therefore, the oxidation zone of one of the reaction zones 22, 24 is adjacent to the reforming zone of the other reaction zone 24, 22. Thus, advantageous thermal equalization between the reaction zones 22, 24 can take place. The product gases are supplied via the product gas guide 38, 40 to the mixing point 42, downstream of which the finished reformate 20 can be removed and supplied to other applications. If the entire reformer has, for example, an output range from 3 to 15 kW, i.e., the output can be modulated in a ratio of 5:1, for example, the two reaction zones 22, 24 being designed such that they can each deliver a reformer output between 3 and 7.5 kW. Each individual reaction zone need therefore have only one modulation capacity of 2.5:1. The maximum output of the reformer is obtained by parallel operation of the two reaction zones 22, 24, while the minimum output is achieved by shutting down one of the reaction zones 22, 24 and operating the other reaction zone 22, 24 with minimum output. The lower required output modulations in the individual reaction zones are expressed especially in a better localization of the hotspot.

In the aforementioned example, it is necessary to shut down one of the reaction zones when the reformer is to operate with a low output of, for example, 3 kW. However, it is also possible for the two reaction zones 22, 24 to be in operation over the entire output range, even at low output. Here, in any case, the improvement due to reduced load modulation is relinquished for the benefit of a more homogeneous temperature profile. If we again proceed from the example that the reformer overall is to have an output range from 3 to 15 kW, i.e., a modulation capacity of 5:1, in the required parallel operation of the two reaction zones even at a small output, each of the reaction zones can be designed for a reformer output between 1.5 and 7.5 kW, i.e., each of the reaction zones has a modulation capacity of 5:1.

Other possibilities arise due to the fact that the two reaction zones 22, 24 are operated with different air ratios, for example, with $\lambda<1$ or $\lambda>1$. This can be useful, for example, for regeneration of the catalyst 36.

It can also be provided that the air flow which enters one of the "reaction zones" 22, 24 is used only for cooling of the other reaction zone 22, 24. In this case, the remaining atmospheric oxygen starting with the mixing point 42 can oxidize the components of the other partial flow (for example, $H_2$, CO, residual hydrocarbons, soot). The resulting increase of the S/C ratio in the reformate can be advantages for downstream components, especially for a fuel cell, as a result of the reduced soot formation.

To this point, it has been assumed that the two reaction zones are designed to be identical with respect to their output ranges and their modulation capacity. However, it can also be a good idea to implement asymmetry with respect to the output ranges of the two reaction zones 22, 24, especially in conjunction with use of the heat exchanger 26. If the outer reaction zone 24 is provided with a higher maximum reformer output, most of the heat is formed at the location from where it can be effectively released to the heat exchanger 26 which is located in the outer area of the reformer 10. If, the example of a reformer with an output range from 3 to 15 kW and a modulation capacity of 5:1 is again assumed, for example, the outer reaction zone 24 could be provided with a reformer output from 3 to 9 kW and a modulation capacity of 3:1, while the inner reaction zone 22 has an output range from 3 to 6 kW and a modulation capacity of 2:1. The outer reaction zone 24 can therefore deliver 60% of the total output, while the inner reaction zone 22 can deliver only 40%.

The examples above relate to an implementation of a reformer with two reaction zones. They can easily be applied to an implementation with more than two reaction zones, by which especially the variation possibilities are increased with respect to the design of the output or modulation ranges.

Figure 2:
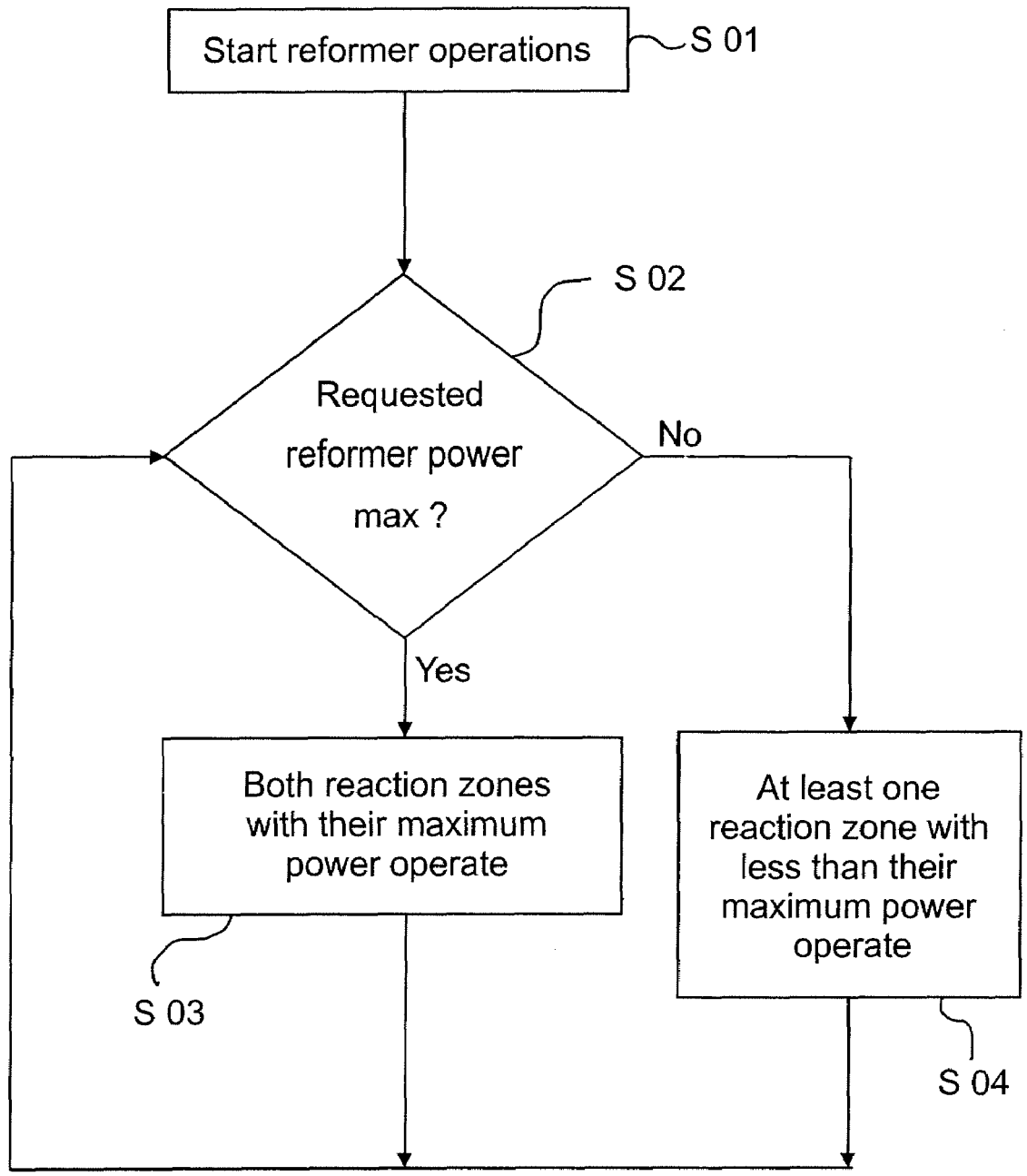
FIG. 2 is a flow chart for explaining the process of the invention.

FIG. 2 shows a flow chart for explaining the process as claimed in the invention. After starting reformer operation in step S01, the reformer output which is required of the entire system is monitored. If this required reformer output is, for example, maximum (step SO2), the two reaction zones are operated with their maximum reformer output (step SO3). If the required reformer output is not maximum, according to step SO4 at least one of the reaction zones is operated with reduced output. Thus, by continuous monitoring, the reformer can vary its output in the desired manner with the advantages of the invention noted above. This illustrated, highly simplified operating principle can be especially refined in that step SO2 is developed such that, depending on the required reformer output, different operating states are set with respect to the participating reaction zones, and in addition to the output requirements, also other parameters can be taken into account.

The features of the invention disclosed in the description above, in the drawings and in the claims are important both individually and also in any combination for implementation of the invention.

What is claimed is:

1. Process for reacting fuel and oxidizer into reformate in a reformer having a reaction zone and at least one additional reaction zone, the reaction zones having an essentially axially symmetrical arrangement with one reaction zone surrounding the other, comprising the steps of
   supplying fuel and oxidizer to the reaction zone and to at least one additional reaction zone with a main flow direction of the fuel and oxidizer being essentially axial,
   reacting fuel and oxidizer into reformate in each of the reaction zones,
   separately adjusting output from each of the reaction zones by adjusting at least one of fuel and oxidizer inputs,
   dissipating heat from the reaction zones with a heat exchanger, and
   delivering a higher maximum reformer output from an outer one of the reaction zones than from an inner one of the reaction zones.

2. Process for reacting fuel and oxidizer into reformate in a reformer having a reaction zone and at least one additional reaction zone, the reaction zones having an essentially axially symmetrical arrangement with one reaction zone surrounding the other, comprising the steps of:
   supplying fuel and oxidizer to the reaction zone and to at least one additional reaction zone with a main flow direction of the fuel and oxidizer being essentially axial,
   reacting fuel and oxidizer into reformate in each of the reaction zones,
   separately adjusting output from each of the reaction zones by adjusting at least one of fuel and oxidizer inputs,
   dissipating heat from the reaction zones with a heat exchanger, and
   transferring heat with the heat exchanger to an air flow routed to a cathode of a fuel cell.

3. Process as claimed in claim 2, wherein main flow directions in adjacent reaction zones are opposite each other.

4. Process as claimed in claim 2, wherein the fuel and oxidizer are reacted into reformate by partial oxidation (POX).

5. Process as claimed in claim 4, wherein the fuel and oxidizer are reacted into reformate by catalytic partial oxidation (CPOX).

6. Process for reacting fuel and oxidizer into reformate in a reformer having a reaction zone and at least one additional reaction zone, comprising the steps of:
   supplying fuel and oxidizer to the reaction zone and to at least one additional reaction zone with a main flow direction of the fuel and oxidizer being essentially axial,
   reacting fuel and oxidizer into reformate in each of the reaction zones,
   separately adjusting output from each of the reaction zones by adjusting at least one of fuel and oxidizer inputs,
   wherein the oxidizer is air and the air flow entering one of the reaction zones is used only for cooling of the other reaction zone.

7. Process as claimed in claim 6, wherein:
the reaction zones have an essentially axially symmetrical arrangement, one reaction zone surrounding the other,
the main flow direction of the fuel and oxidizer is essentially axial, and
the main flow directions are opposite in adjacent reaction zones.

8. Process as claimed in claim 6, comprising the further step of dissipating heat from the reaction zones with a heat exchanger.

9. Process for reacting fuel and oxidizer into reformate in a reformer having a reaction zone and at least one additional reaction zone, comprising the steps of:

supplying fuel and oxidizer to the reaction zone and to at least one additional reaction zone with a main flow direction of the fuel and oxidizer being essentially axial,
reacting fuel and oxidizer into reformate in each of the reaction zones,
separately adjusting output from each of the reaction zones by adjusting at least one of fuel and oxidizer inputs, and
regenerating the reaction zones independently of one another using the oxidizer.

10. Process as claimed in claim 9, wherein the reaction zones are in thermal contact.

* * * * *